(12) United States Patent
Kempf et al.

(10) Patent No.: US 9,732,511 B2
(45) Date of Patent: Aug. 15, 2017

(54) TRUSS HINGE WITH VARIATIONS IN ANGULAR SETTINGS

(71) Applicant: Production Resource Group LLC, New Windsor, NY (US)

(72) Inventors: James Kempf, Wallkill, NY (US); Scott Gross, Mississauga (CA)

(73) Assignee: Production Resource Group, LLC, New Windsor, NY (US)

( * ) Notice: Subject to any disclaimer, the term of this patent is extended or adjusted under 35 U.S.C. 154(b) by 0 days.

(21) Appl. No.: 15/244,581

(22) Filed: Aug. 23, 2016

(65) Prior Publication Data

US 2016/0362886 A1 Dec. 15, 2016

Related U.S. Application Data

(60) Division of application No. 14/507,664, filed on Oct. 6, 2014, now Pat. No. 9,422,972, which is a continuation of application No. 12/968,598, filed on Dec. 15, 2010, now Pat. No. 8,850,774.

(60) Provisional application No. 61/286,743, filed on Dec. 15, 2009.

(51) Int. Cl.
| | | |
|---|---|---|
| E04B 1/344 | (2006.01) |
| F16C 11/04 | (2006.01) |
| E05D 11/06 | (2006.01) |
| B66C 3/00 | (2006.01) |
| E04C 3/04 | (2006.01) |
| E04B 1/24 | (2006.01) |

(52) U.S. Cl.
CPC .............. *E04B 1/344* (2013.01); *B66C 3/00* (2013.01); *E04B 1/2403* (2013.01); *E04C 3/04* (2013.01); *E05D 11/06* (2013.01); *F16C 11/04* (2013.01); *E04B 2001/2439* (2013.01); *E04B 2001/2457* (2013.01); *E04C 2003/0486* (2013.01); *Y10T 16/5323* (2015.01); *Y10T 29/24* (2015.01)

(58) Field of Classification Search
CPC . F16C 11/04; B66C 3/00; E05D 11/06; Y10T 29/24; Y10T 16/5323; E04B 1/344
USPC ........ 52/640, 641, 656.9, 167.1, 167.3, 643, 52/645, 646, 649.5, 71, 745.14, 29
See application file for complete search history.

(56) References Cited

U.S. PATENT DOCUMENTS

| | | |
|---|---|---|
| 506,006 A | 10/1893 | Kreider |
| 1,112,542 A | 10/1914 | Loser |
| 1,787,167 A | 12/1939 | Purdy |
| 2,722,294 A | 11/1955 | Lagaard |
| 3,043,409 A | 7/1962 | Kremer et al. |
| 3,077,960 A | 2/1963 | Gunther |
| 3,086,256 A | 4/1963 | Schieber, Jr. |
| 3,091,816 A | 6/1963 | Wetzel |
| 3,167,285 A | 1/1965 | Suozzo |
| 3,423,898 A | 1/1969 | Coloney |
| 3,479,783 A | 11/1969 | Jureit |

(Continued)

FOREIGN PATENT DOCUMENTS

| | | |
|---|---|---|
| EP | 2378018 A2 | 10/2011 |
| JP | 2011179169 A | 9/2011 |

(Continued)

*Primary Examiner* — Rodney Mintz

(74) *Attorney, Agent, or Firm* — Law Office of Scott C Harris, Inc

(57) ABSTRACT

A truss hinge that includes a number of different labeled parts, where connections between the two different parts can constrain the truss to different angles.

5 Claims, 11 Drawing Sheets

(56) References Cited

U.S. PATENT DOCUMENTS

| | | |
|---|---|---|
| 3,605,355 A | 9/1971 | Solesbee |
| 3,646,725 A | 3/1972 | Troutner |
| 3,701,225 A | 10/1972 | Perry |
| 3,760,550 A | 9/1973 | Mueller et al. |
| 3,785,108 A | 1/1974 | Satchell |
| 3,812,638 A | 5/1974 | Lerch et al. |
| 3,823,522 A | 7/1974 | Jureit et al. |
| 3,846,953 A | 11/1974 | Hodess |
| 3,849,953 A | 11/1974 | Cohen |
| 3,863,419 A | 2/1975 | Hendrich |
| 3,890,747 A | 6/1975 | Van Der Lely |
| 3,965,625 A | 6/1976 | White |
| 3,971,185 A | 7/1976 | Hendrich |
| 4,000,588 A | 1/1977 | van der Lely |
| 4,148,164 A | 4/1979 | Humphrey |
| 4,170,852 A | 10/1979 | Danis, Jr. |
| 4,295,318 A | 10/1981 | Perlman |
| RE31,234 E | 5/1983 | Jureit et al. |
| 4,381,635 A | 5/1983 | Solo |
| 4,449,335 A | 5/1984 | Fahey |
| 4,483,120 A | 11/1984 | Gottlieb |
| 4,538,393 A | 9/1985 | Mitchell |
| 4,862,336 A | 8/1989 | Richardson et al. |
| 4,872,295 A | 10/1989 | Fujita |
| 4,897,979 A | 2/1990 | Colonias |
| 4,926,591 A | 5/1990 | Buijs |
| 4,976,075 A | 12/1990 | Kaveckis et al. |
| 5,016,403 A | 5/1991 | Fujita |
| 5,094,059 A | 3/1992 | Ganescu |
| 5,337,531 A | 8/1994 | Thompson et al. |
| 5,426,822 A | 6/1995 | Weir |
| 5,553,961 A | 9/1996 | Olden |
| 5,570,971 A | 11/1996 | Rixen |
| 5,701,713 A | 12/1997 | Silver |
| 5,711,131 A * | 1/1998 | Thomas .................. E04C 3/08 403/170 |
| 5,715,642 A | 2/1998 | Buers |
| 5,725,279 A | 3/1998 | Ward et al. |
| 5,737,882 A | 4/1998 | Eckert et al. |
| 5,819,492 A | 10/1998 | Konicek |
| 5,846,018 A | 12/1998 | Frobosilo et al. |
| 5,857,295 A | 1/1999 | Mikawa |
| 5,890,339 A | 4/1999 | Willis |
| 5,950,392 A | 9/1999 | Short et al. |
| 6,000,191 A | 12/1999 | Kessler |
| 6,045,114 A | 4/2000 | Nogami |
| 6,047,513 A | 4/2000 | Gibson |
| 6,061,970 A | 5/2000 | Fujita |
| 6,324,810 B1 | 12/2001 | Thompson |
| 6,401,422 B1 | 6/2002 | Olden |
| 6,430,887 B1 | 8/2002 | Daudet |
| 6,629,391 B1 | 10/2003 | Børresen et al. |
| 6,634,152 B1 | 10/2003 | Pilkinton |
| 6,681,538 B1 | 1/2004 | Sarkisian |
| 6,711,780 B2 | 3/2004 | Lee |
| 6,772,570 B2 | 8/2004 | Horne |
| 6,971,623 B2 | 12/2005 | Allmon et al. |
| 7,131,243 B1 | 11/2006 | Sirowatka |
| 7,475,517 B2 | 1/2009 | Kawai et al. |
| 7,677,009 B2 | 3/2010 | Bowman |
| 7,779,599 B2 | 8/2010 | Jolicoeur et al. |
| 7,891,144 B2 | 2/2011 | Gilstrap et al. |
| 7,918,054 B2 | 4/2011 | Grafton et al. |
| 8,028,487 B2 | 10/2011 | Engstrom |
| 8,099,913 B1 | 1/2012 | Dodd |
| 8,245,479 B2 | 8/2012 | Gannon et al. |
| 8,407,947 B2 | 4/2013 | Yaggi et al. |
| 8,414,214 B2 | 4/2013 | Martin |
| 8,453,403 B2 * | 6/2013 | Wheeler .................. E04B 9/06 52/241 |
| 8,453,407 B2 | 6/2013 | Tedesco et al. |
| 8,572,924 B2 | 11/2013 | Kempf |
| 8,590,214 B2 | 11/2013 | Laprise et al. |
| 8,641,312 B2 | 2/2014 | Todd et al. |
| 8,720,152 B2 | 5/2014 | Kempf et al. |
| 8,850,774 B2 | 10/2014 | Kempf et al. |
| 8,869,484 B2 * | 10/2014 | Gulbrandsen .......... E04B 9/061 52/245 |
| 8,915,041 B2 | 12/2014 | Kempf |
| 9,175,472 B1 | 11/2015 | Calini |
| 9,422,972 B2 * | 8/2016 | Kempf ...................... B66C 3/00 |
| 9,453,359 B2 * | 9/2016 | Kempf .................. E04B 1/2403 |
| 2006/0157100 A1 | 7/2006 | Zeigler |
| 2006/0185311 A1 | 8/2006 | Attalla et al. |
| 2007/0151200 A1 | 7/2007 | Madray |
| 2007/0292204 A1 | 12/2007 | Hackney |
| 2009/0173033 A1 * | 7/2009 | Baxter, Jr. ................ A63J 1/00 52/646 |
| 2009/0183460 A1 * | 7/2009 | Wheeler .................. E04B 9/06 52/717.03 |
| 2009/0211177 A1 | 8/2009 | Grafton et al. |
| 2009/0293374 A1 | 12/2009 | Davarpanah |
| 2010/0077694 A1 | 4/2010 | Quintile et al. |
| 2010/0101172 A1 | 4/2010 | Murphy et al. |
| 2010/0269445 A1 | 10/2010 | Gannon et al. |
| 2010/0269446 A1 | 10/2010 | Merrifield |
| 2011/0023406 A1 | 2/2011 | Todd et al. |
| 2011/0142591 A1 | 6/2011 | Kempf et al. |
| 2011/0265421 A1 | 11/2011 | Kempf et al. |
| 2012/0023861 A1 | 2/2012 | Kempf |
| 2012/0297718 A1 | 11/2012 | Kempf |
| 2013/0145717 A1 | 6/2013 | Merrifield |
| 2013/0263548 A1 | 10/2013 | Merrifield |
| 2014/0157686 A1 | 6/2014 | Weeks |
| 2014/0260062 A1 | 9/2014 | Donnelly et al. |
| 2015/0086322 A1 * | 3/2015 | Kempf ...................... B66C 3/00 414/800 |
| 2016/0145867 A1 * | 5/2016 | Kennelly .............. E04B 7/022 52/646 |

FOREIGN PATENT DOCUMENTS

| | | | |
|---|---|---|---|
| WO | 0079077 A1 | 12/2000 | |
| WO | 0183903 A1 | 11/2001 | |
| WO | WO 2008002658 A2 * | 1/2008 | ............... E04B 9/06 |

\* cited by examiner

TRUSS HINGE WITH VARIATIONS IN ANGULAR SETTINGS

This application is a divisional application Ser. No. of 14/507,664, filed Oct. 6, 2014, which was a continuation application of U.S. Ser. No. 12/968,598 filed Dec. 15, 2010, now U.S. Pat. No. 8,850,774 issued Oct. 7, 2014, which claims priority from provisional application Ser. No. 61/286,743, filed Dec. 15, 2009, the disclosures of each of these parent applications are hereby incorporated by reference, in their entirety.

BACKGROUND

In a stage environment, it may be useful to move scenery. Trusses are often used in stage lighting applications to hold stage lights and other items as support pieces above the ground. Two pieces of truss may be held together.

SUMMARY

An embodiment describes a truss hinge that allows hinging, and facilitates setting different templates for moving or for pivoting the trusses relative to one another.

Embodiments describe a hinging truss, with two truss parts that are connected by a special hinge that allows the truss to be used and stay in multiple different configurations.

DETAILED DESCRIPTION

Figure 14:
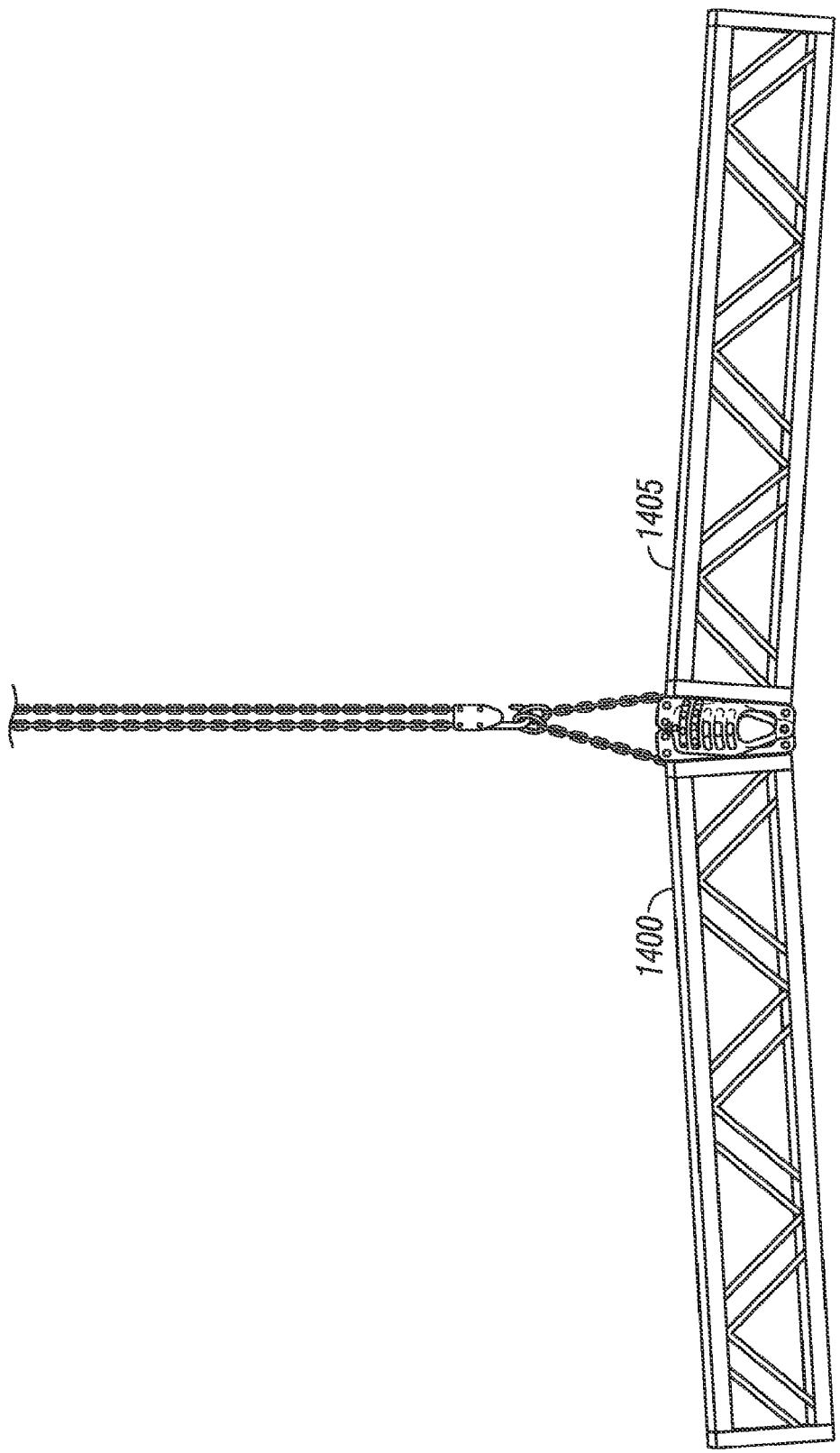
FIGS. 14-17 show trusses attached to the truss hinges, in different angular positions.

The embodiment described herein describes a truss and hinge assembly that allows maintaining two different truss parts at different angles relative to one another. FIG. 14 shows how the two truss parts 1400, 1405 can be held together by a hinging part 1410. The hinging part includes special structure as described herein which allows holding the truss at a number of different configurations relative to one another. The two truss parts can be held at 0° relative to one another as shown in FIG. 14 for transportation, and then raised to thereby form another angle between the parts.

Figure 15:
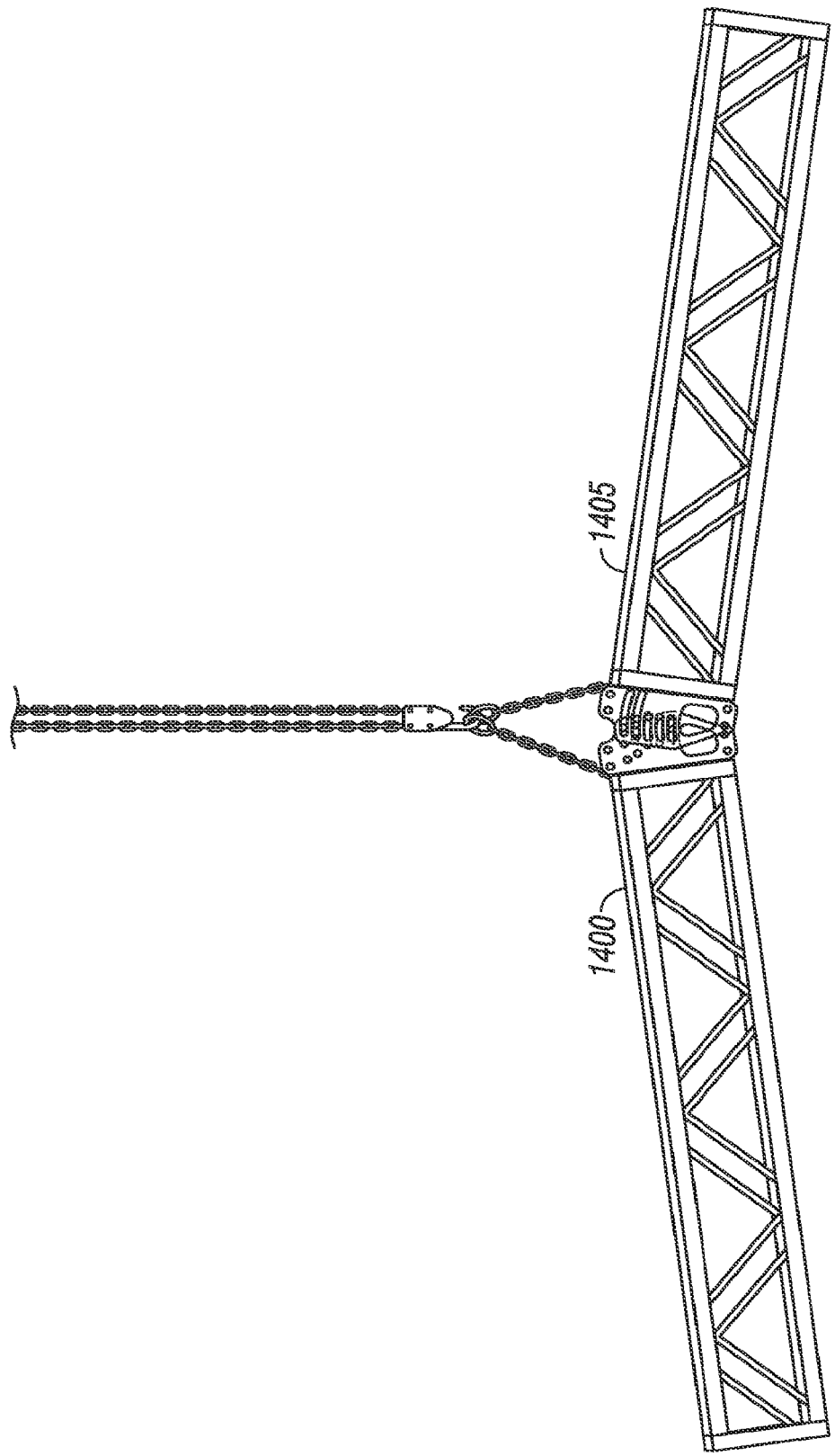

FIG. 15 shows truss parts at 5° relative to one another, with the truss hinge connected and coupled in a different configuration than that in FIG. 14. This may be the final position of the truss as it's raised, or if the pins/bolts are in different holes, the truss may pivot more, going to different angles as it is raised.

Figure 16:
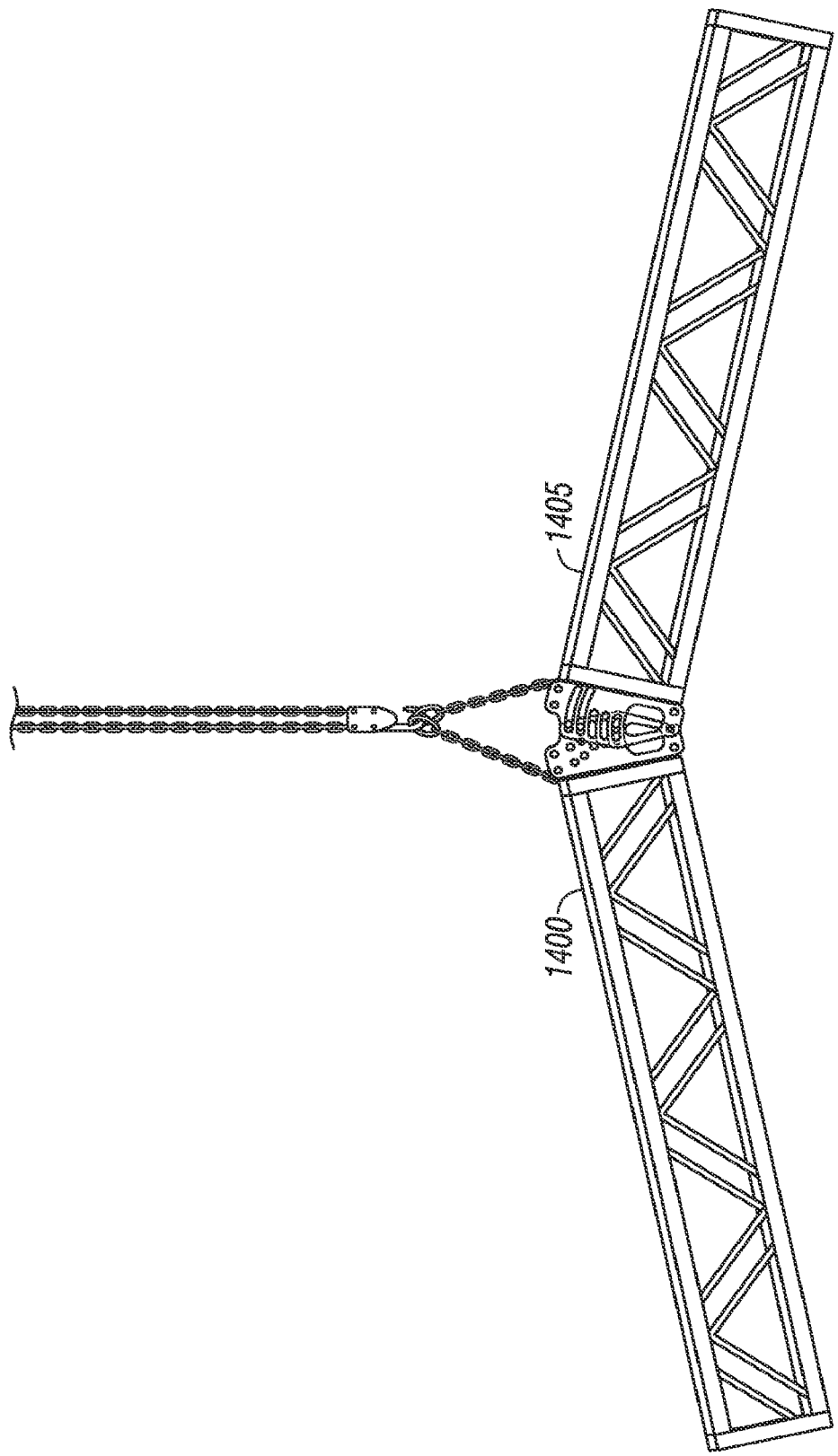
Figure 17:
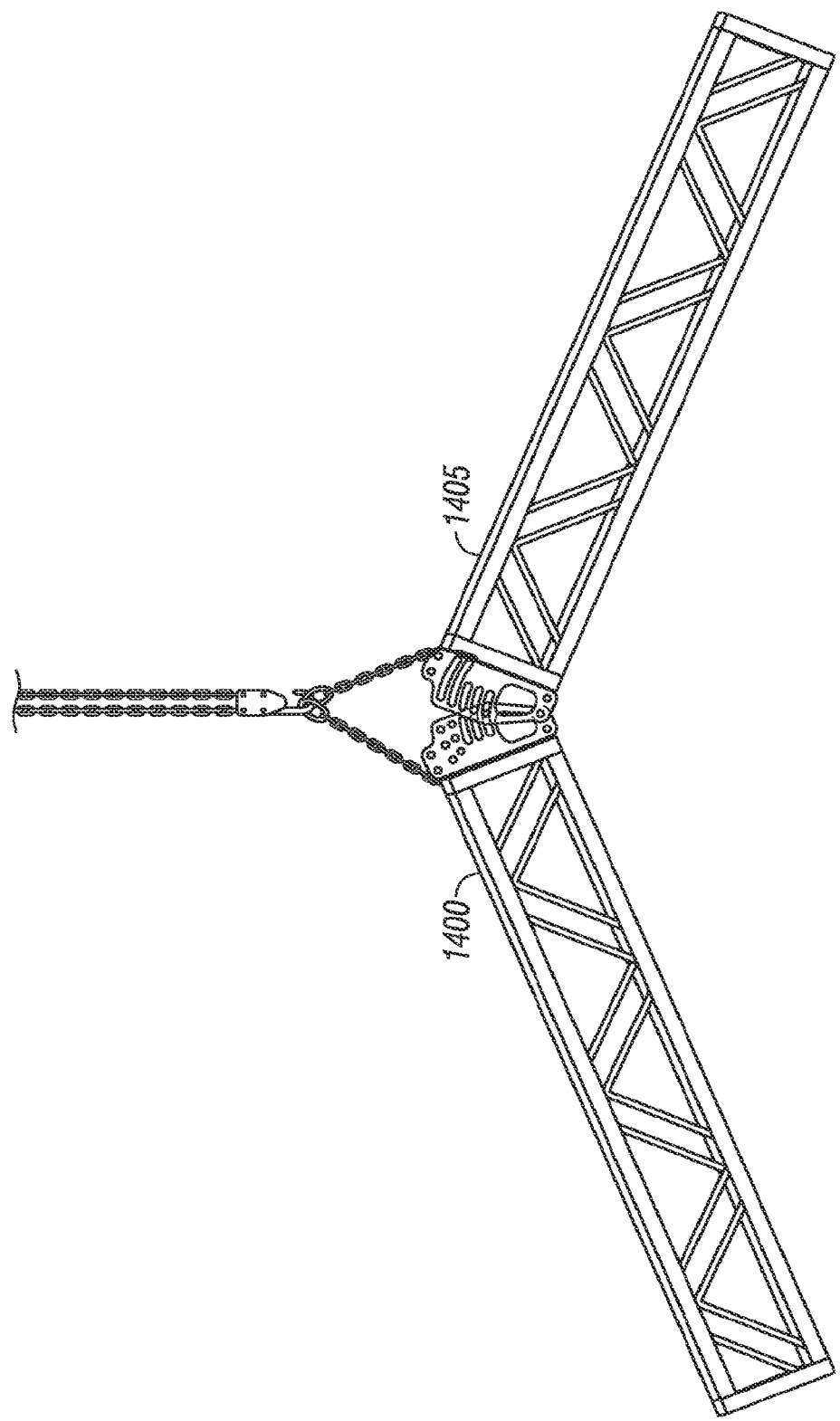

FIG. 16 illustrates a 20° angle between the truss parts, and FIG. 17 illustrates a 45° angle between the truss parts.

The system as used herein includes truss hinges which are described herein and which have connection parts attached to the ends of the trusses. The trusses 1400, 1405 are each attached to one side of the hinge. The hinge can move between different angles, thereby hinging and holding the trusses at different angles between one another. At each of the plurality of angles, there is a special pin connection that allows holding and/or the truss at that specific angle.

In this embodiment, the trusses can be transported "flat", e.g., with a 0° angle between the truss sections as shown in FIG. 14. The trusses can be moved on carts, for example. The pin is then removed from the zero degree hole, and placed in the hole for the desired angle. As the trusses are raised, they pivot until the desired angle is reached, as shown in FIGS. 15-17. Once raised, the truss sections are at the desired angle set by the pivots and the pins.

According to the embodiment, there are different stop surfaces. In the embodiment, holes, slots and surfaces interplay to limit and hold the hinging at different angles between the hinge portions. Each hole or slot is marked, and corresponds to one specific angle between the truss pieces. A pin or bolt is placed in the hole or slot, and holds the hinges at the different angles.

Figure 1:
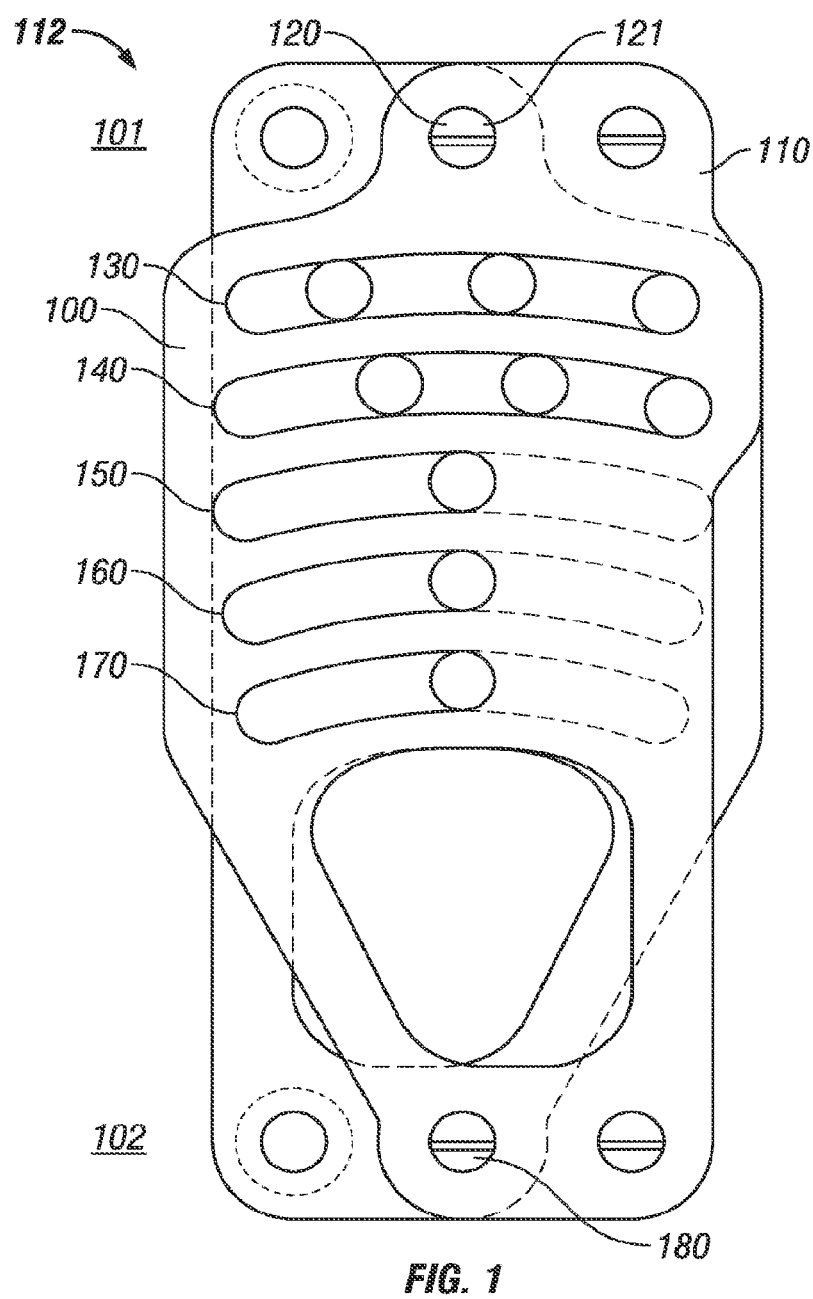
FIG. 1 shows the assembled truss hinge from a front view.

FIG. 1 illustrates the assembled truss hinge, formed of two different parts that are hinged together to move relative to one another. The hinge as shown in FIG. 1 is set in a 0° position, with the left hinge part 100 pressed completely against the right hinge part 110. Both of the hinge parts include different attachment holes, including the center attachment hole 120. A bolt or pin 121 can be placed in the center attachment hole in order to hold the two parts together at 0° for transport.

The left side hinge plate 100 includes the connections 101, 102 which are substantially cylindrical in inner cross-section to hold a pole end of a truss assembly. Each of the holders such as 101 includes a bolt hole such as 112 which can bolt to the appropriate truss piece. As explained herein, there are also a number of central shafts, shown as 130, 140, 150, 160 and 170. As explained herein, the openings on the left side piece 100 are different than those of the right side piece 110, and enable holding the hinge assembly into position at a rotational amount, or locked against pivoting by more than an amount.

A pivot point 180 may allow movement or angular movement between the left hinge part 100 and right hinge part 110. The pivot point can be a pin or bolt, e.g., for a metal to metal hinging, or the bolt can have a Teflon or plastic sleeve around it. The hinging allows the movement between the hinge parts to different angular amounts.

Figure 2:
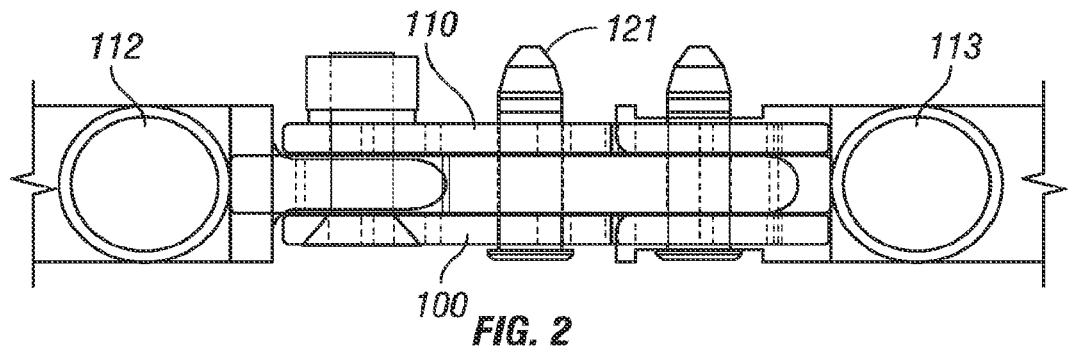
FIG. 2 shows an edge view of the truss.

FIG. 2 illustrates a side view of the hinge, showing the different connections to the two different hinge parts 100, 110. This also shows the side view of the bolt 121, and how that bolt extends through both sides of the hinge.

In operation, the system has a number of different parts that connect together to hold the device in two different angular locations. In addition, as shown, for example, in FIGS. 12 and 13, the different parts can be labeled so that or engraved in a way that allows different users to select desired angles between the different trusses.

Figure 12A:
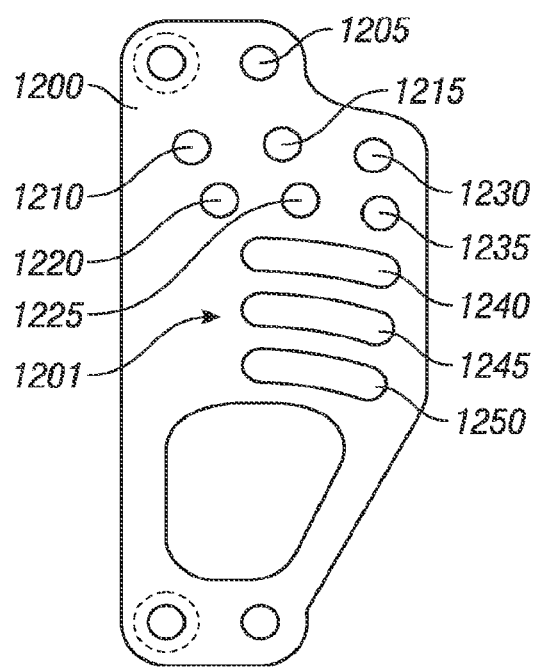
FIGS. 12A, 12B, 13A and 13B show the disassembled angle truss parts.
Figure 12B:
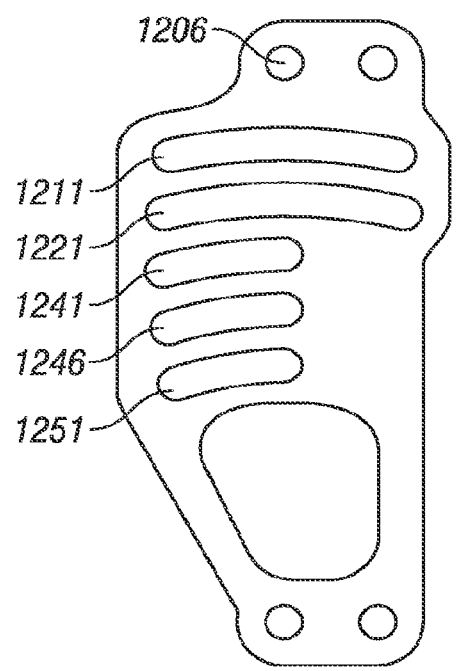

In the embodiment, the left plate forms the outer plate of the left/right hinge combination. FIG. 12A shows the left/outer plate, while FIG. 12B shows the right/inner plate of the embodiment. The outer plate includes a number of different holes shown generally as 1200 and a number of slots shown as 1201.

Figure 13A:
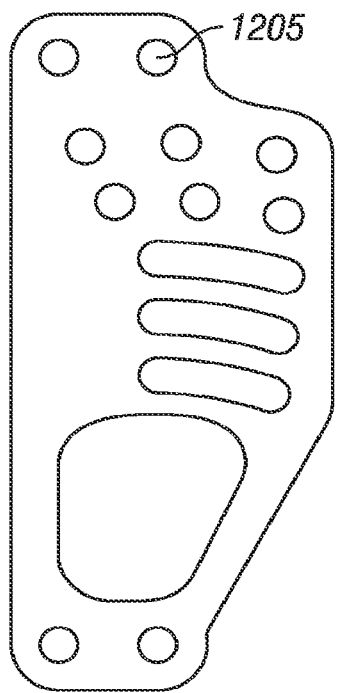
Figure 13B:
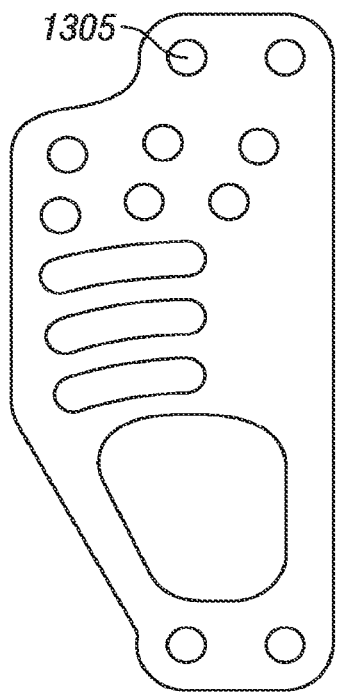

The outer plate is as shown in FIG. 12A as the left plate. However, on the other side of the hinge, the outer plate can be the right plate. FIG. 13A shows the outer/left plate, with its engraving thereon. FIG. 13B shows the outer/right plate with the engraving thereon.

FIG. 13A illustrates how engraving may be formed on these holes, showing which hole can hold a bolt that keeps the hinge at specified locations. The outer plate in FIG. 13A is the reversed image of the outer plate in FIG. 13B, but both will be used on opposite sides of the same truss. For example, in order to maintain the two truss parts at 0° relative to one another, bolts are placed through the 0° hole 1205 shown in FIG. 13A and the corresponding 0° hole in FIG. 13B.

When the two trusses are thus held together, they are in the position shown in FIG. 1 with the bolt 121 passing through the hole 1205 in the outer plate, and through the corresponding hole 1206 on the inner plate of FIG. 12B, thereby holding the two parts together.

In the embodiment, only the outer plates receive engraving, and since the inner plates are inside the outer plates, they receive no engraving or countersinks for bolts.

Figure 3:
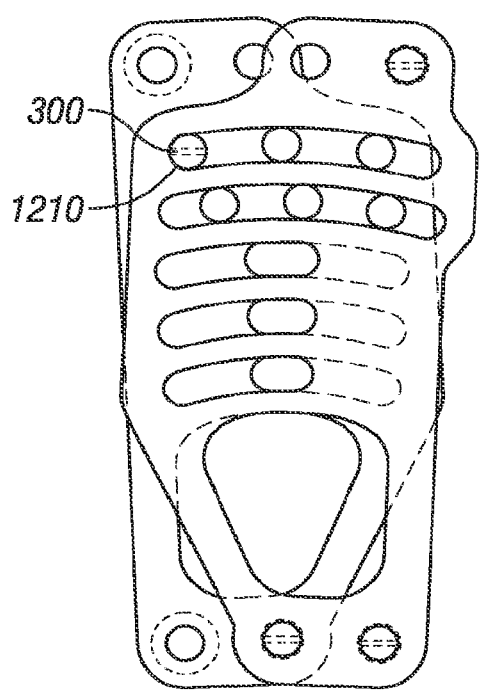
FIGS. 3-11 show different angular relations between the trusses.

The 5° hole maintains or limits a 5° separation between the inner and outer parts. A bolt is placed in the 5° hole 1210, which mates with the slot 1211. This allows movement between the hinge parts, but does not allow the hinge parts to pivot more than 5° apart, as shown in FIG. 3. FIG. 3 illustrates the bolt 300 in the hole 1210, and how this holds the hole 1210 into the inner surface 1211 of the inner plate, thereby constraining the movement of the hinges to 5°.

Figure 4:
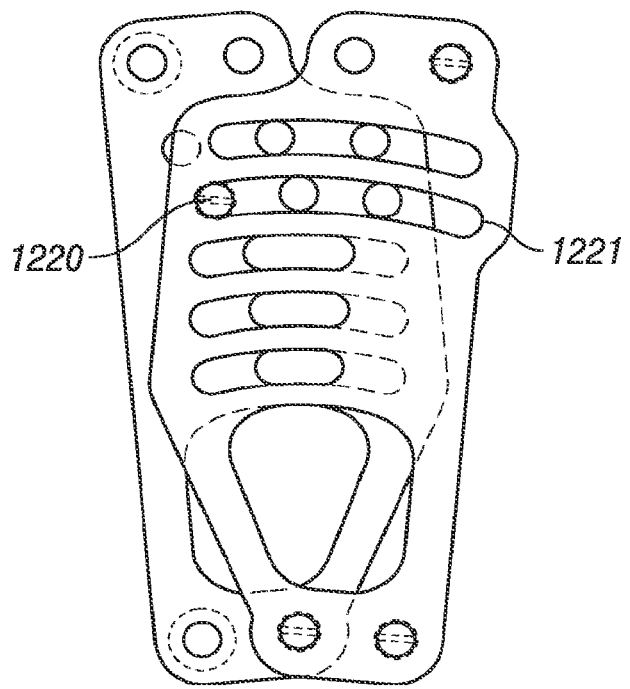

The 10° separation connection uses the hole 1220 held into the slot 1221 by the bolt as shown in FIG. 4.

Figure 5:
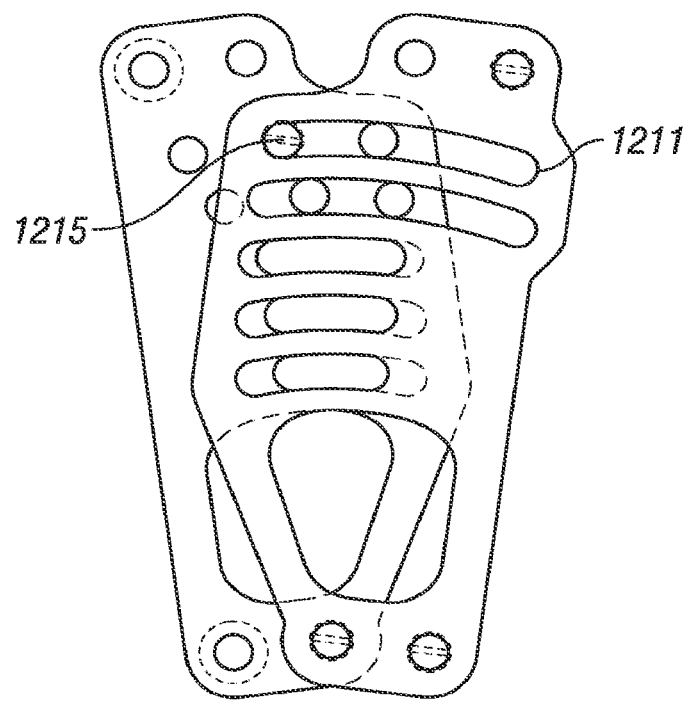

For 15°, the bolt holds the hole 1215 within the slot 1211, as shown in FIG. 5 where the screw 500 holds between the hole 1220 in the slot 1211. That is, the same slot 1211 is used for 5 and for 15 degrees. (and also, as explained herein, that same slot 1211 for 25 degrees).

Figure 6:
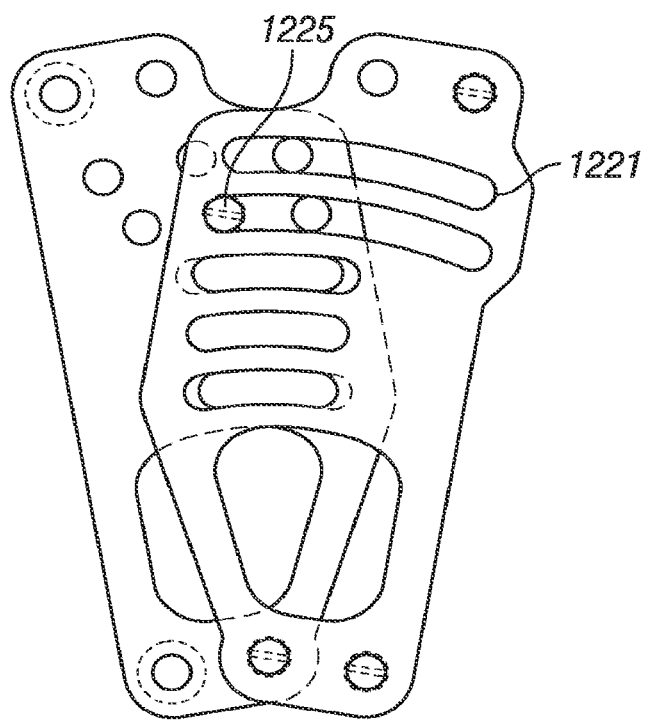

The screw 400 constraints between the two pivots. For 20°, the hole 1225 is used, against the slot 1221 as shown in FIG. 6. Again, that means that the same slot 1221 is used for 10° and 20° (and 30°).

Figure 7:
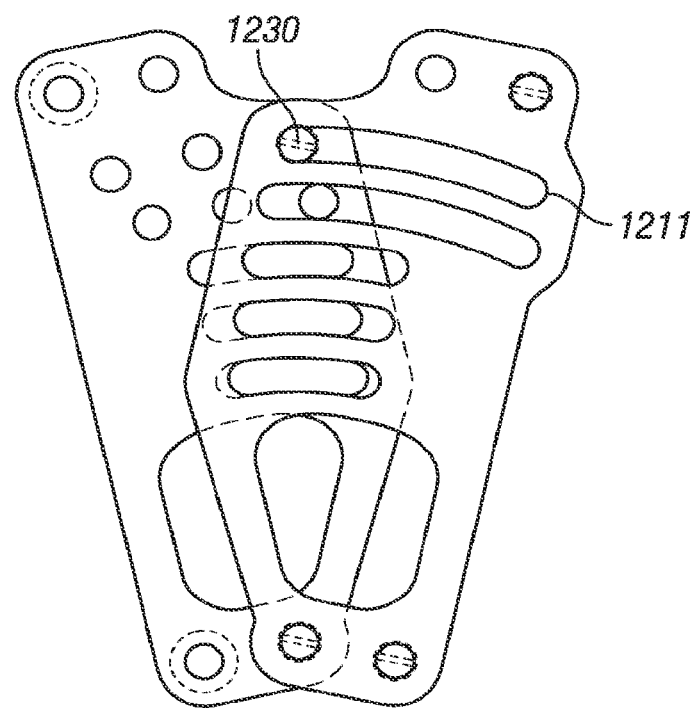

In a similar way, for 25°, the hole 1230 may be used with slot 1211 as shown in FIG. 7.

Figure 8:
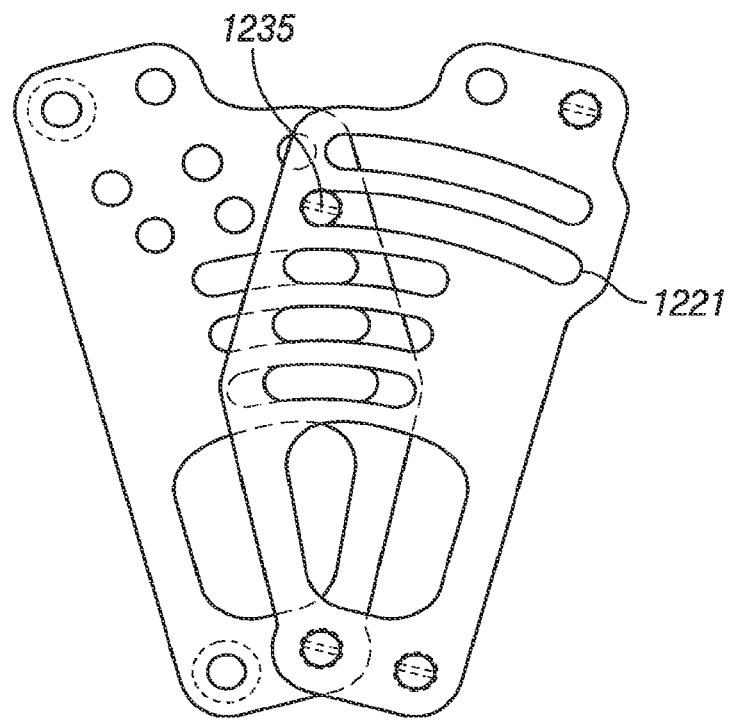
Figure 9:
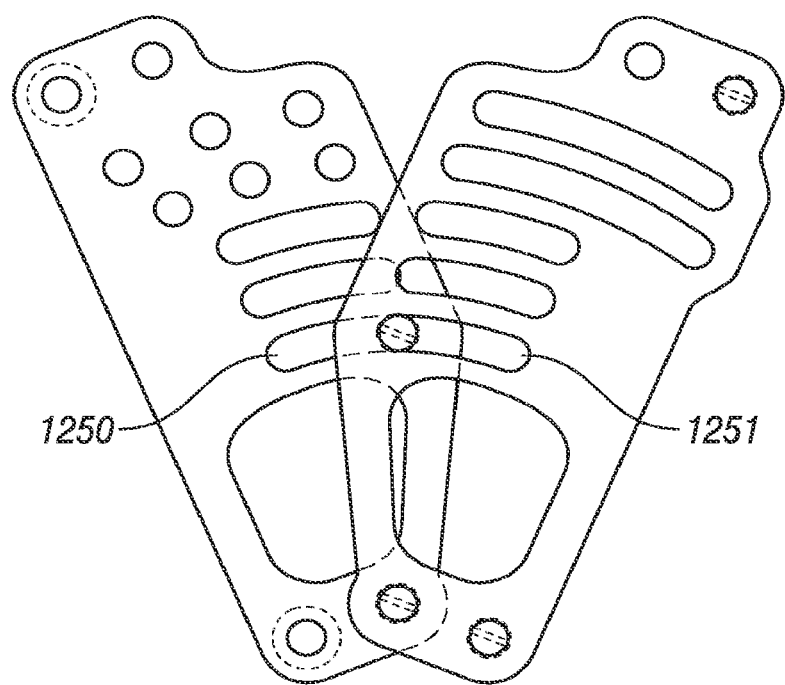

For 30° the hole 1235 may be used with slot 1221 as shown in FIG. 8.

Figure 10:
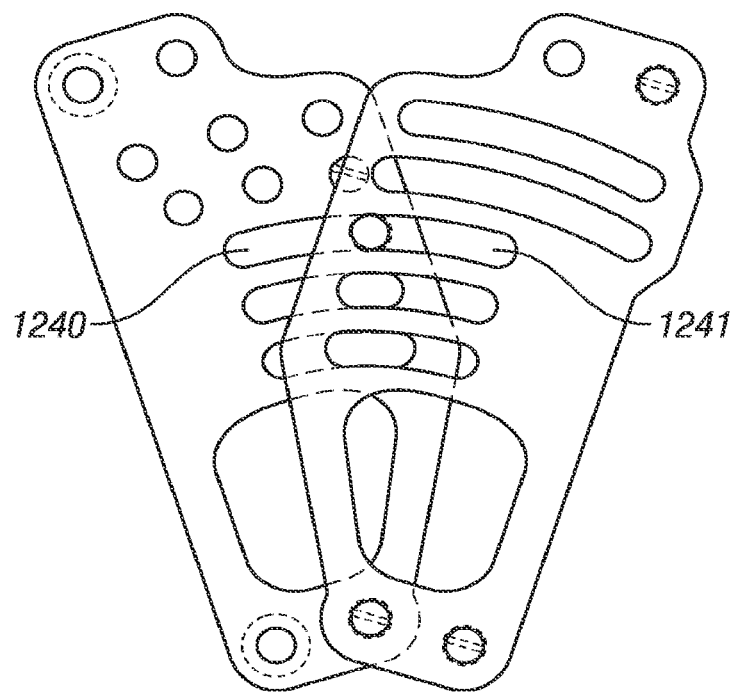

For a 35° difference, two different slots are mated, with the bolt being placed in the slot 1240, and held against slot 1241, as shown in FIG. 10.

Figure 11:
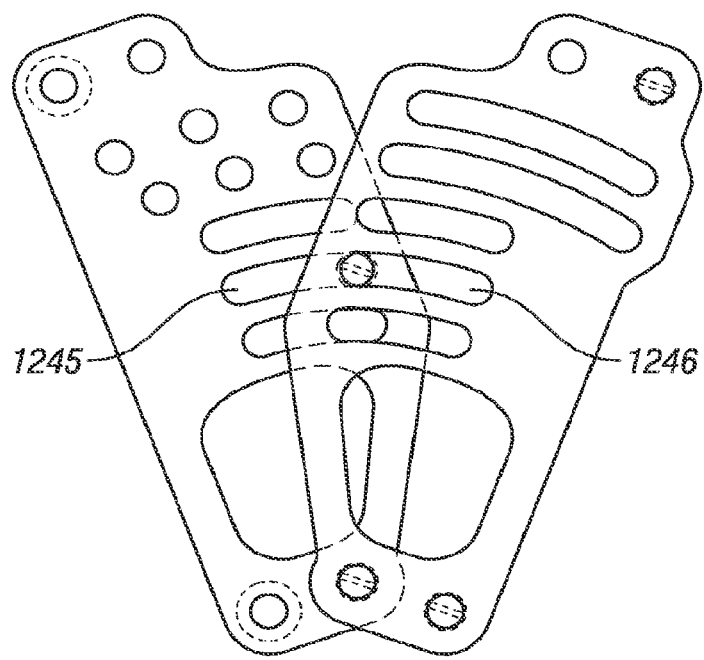

FIG. 11 illustrates the screw being placed in the 40 degree slot 1245, held against slot 1246.

FIG. 10 illustrates use of the 45° slot 1250 against mating slot 1251.

By using the labeled surfaces to hold between the hinge parts, the hinge can be constrained and held at different angles. In this embodiment, the trusses are held at 0, 5, 10, 15, 20, 25, 30, 35, 40 and 45° relative to one another. Bolts hold in the different holes in order to hold the truss pieces at these different angles relative to one another. Each hole automatically stops the two hinge parts from moving beyond the limit of the selected angle. However, the truss can be held and/or raised in its flat configuration, then pivoted, but the pivoting amount is constrained by which of the pins have been installed.

For example, when the 5° pivot hole is used, the truss can pivot to as much as 5° relative to one another. When the 10° pivot hole is used, the trusses can move to as much as 10° relative to one another. However, the trusses can still straighten out to 0°, and can pivot to an angle as much as 10°. If bolts are tightened into the holes between the outer and inner pieces, the trusses can be constrained to limit to these angular extents.

Since the outer pieces are labeled, this can facilitate setting up the trusses at complex angles relative to one another.

In one embodiment, the truss hinge is made for example of ¾ inch steel for the inner plates and ⅜ inch steel for the outer plates.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example other configurations for other angles are possible. Also, while this system allows the trusses to move relative to one another until reaching the "stop angle". This facilitates, as shown in FIGS. 14-17, raising the truss flat and maintaining it as angled. Another embodiment, however, can rigidly hold the two parts one relative to the other.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of operating a truss hinge, comprising:
   connecting a first hinging part to a first truss which extends away from said first hinging part;
   connecting a second hinging part, hinged relative to said first hinging part via a connection, to a second truss which extends away from said second hinging part,
   where each of the first and second hinging parts have connection surfaces,
   selecting an angle to exist between said first truss and said second truss;
   selecting a first hinging slot on said first said first hinging part and a first surface of said second hinging part based on said angle, where said first hinging slot is a first slot for a first angle and is a second slot for a second angle;
   sliding between said first and second trusses on said hinging parts using said first hinging slot and said first surface of said second hinging part,
   where said first hinging slot and said first surface defines a maximum angle between said first and second trusses at different maximum angles relative to one another,
   sliding said first truss and said second trusses between said different angles along said first hinging slot and said first surface of said second hinging part until reaching a maximum angle constrained by the connection between said first and second hinging parts, said maximum angle limiting the angle between said first and second trusses to an amount of said maximum angle, but allowing said trusses to be held at smaller angles closer to 0° than said maximum angle and at all other angles between said smaller angles up to said maximum angle.

2. The method as in claim 1, wherein said second hinging surface is a hole.

3. The method as in claim 1, further comprising engraving on openings on said first hinging part, said engraving indicating the maximum angle that will be allowed when using said openings.

4. The method as in claim 3, wherein said first hinge part includes surfaces for and markings for 0°, 5°, 10°, 15°, 20°, 25°, 30°, 35°, 40° and 45° angles between said parts.

5. A method of operating a truss hinge, comprising:
connecting a first hinging part to a first truss that extends in a first direction away from the first hinging part;
connecting a second hinging part, hinged relative to said first hinging part, to a second truss that extends in a second direction away from the second hinging part, said first and second trusses forming a truss assembly,
sliding between said first and second trusses on said hinging parts using at least one continuous slot which defines different angles including a first hinging slot which is connected to define a first set of angles including a first angle between said first hinging part and said second hinging part and said second hinging part includes a second hinging surface that is connected to define a second angle between said first hinging part and said second hinging part, and a connection between said first hinging slot and second hinging surface that limits an angle between said first and second trusses at different maximum angles relative to one another,
moving said first truss and said second trusses between said different angles along at least one of said first hinging slot and said second hinging surface, and constraining a maximum angle by connecting between said first and second hinging parts, said maximum angle limiting the angle between said first and second trusses to an amount of said maximum angle, but allowing said trusses to be held at smaller angles closer to 0° than said maximum angle and at all other angles between said smaller angles up to said maximum angle;
connecting to first surfaces on said first hinging part and said second hinging part which hold said trusses at zero degrees relative to one another as one of said different angles where said first direction and said second directions are opposite directions to one another when said trusses are held at zero degrees relative to one another, and transporting said first and second trusses at said zero degree angle; and
connecting to second surfaces on said first hinging part and said second hinging part which hold said trusses at a desired other angle other than zero degrees, and lifting the truss assembly while allowing gravity to move said first and second trusses relative to one another to said desired angle other than zero degrees.

* * * * *